United States Patent [19]

Keilmann

[11] Patent Number: 5,177,635
[45] Date of Patent: Jan. 5, 1993

[54] POLARIZER FOR INFRARED RADIATION

[75] Inventor: Fritz Keilmann, Stuttgart, Fed. Rep. of Germany

[73] Assignee: Max-Planck-Gesellschaft zur Foerderung der Wissenschaften e.V., Goettingen, Fed. Rep. of Germany

[21] Appl. No.: 578,580

[22] Filed: Sep. 6, 1990

[30] Foreign Application Priority Data

Sep. 7, 1989 [EP] European Pat. Off. ........ 89116572.2

[51] Int. Cl.⁵ .............................................. G02B 5/30
[52] U.S. Cl. ..................................... 359/352; 359/360; 359/486; 359/569; 359/575
[58] Field of Search ................ 350/1.1, 370, 394, 395, 350/162.17, 162.2; 359/352, 360, 486, 566, 569, 575

[56] References Cited

U.S. PATENT DOCUMENTS

| | | |
|---|---|---|
| 2,224,214 | 12/1940 | Brown . |
| 4,277,138 | 7/1981 | Dammann .......................... 350/1.1 |
| 4,289,381 | 9/1981 | Garvin . |
| 4,708,436 | 11/1987 | Kleinknecht .................. 350/162.16 |
| 4,712,881 | 12/1987 | Shurtz, II et al. .................. 359/486 |
| 4,743,092 | 5/1988 | Pistor ................................... 350/1.1 |
| 4,846,552 | 7/1989 | Veldkamp et al. ............. 350/162.2 |
| 4,915,463 | 4/1990 | Barbee Jr. ........................... 350/1.1 |
| 4,927,236 | 5/1990 | Keilmann ............................ 350/370 |
| 4,946,231 | 8/1990 | Pistor ................................... 350/1.1 |

FOREIGN PATENT DOCUMENTS

| | | |
|---|---|---|
| 3707983 | 9/1988 | Fed. Rep. of Germany . |
| 3707984 | 9/1988 | Fed. Rep. of Germany . |
| 0874462 | 8/1961 | United Kingdom ............ 350/162.2 |

OTHER PUBLICATIONS

Cambridge Physical Sciences; "Far Infrared Grid Polarssurs" Data Sheet, Bar Hill, Cambridge CB3 8E2, England pp. 1-5, May 22, 1972.
Roumiguieres "The Rectangular-Groove Grating Used as an Infrared Polarizer" Optics Communications; vol. 19, No. 1, Jun. 1976 pp. 76-78.
Challener et al.; "Grid Polarizers for Infrared Fourier Spectrometers"; Infrared Physics; vol. 20 No. 4; Jul. 1980 pp. 215-222.
Beunen et al.; "Performance of Free-Standing Grids Wound from 10-mm-diameter Tungsten Wire at Submillimeter wavelengths: Computation and Measurement" J. Opt. Soc. Am./ vol. 71, No. 2; Feb. 1981; pp. 184-188.
Patent Abstracts of Japan, vol. 9 No. 203 (P-381) 1926—Aug. 21, 1985, 60 066 203 Matsushita Denki.

Primary Examiner—Bruce Y. Arnold
Assistant Examiner—R. D. Shafer
Attorney, Agent, or Firm—Handal & Morofsky

[57] ABSTRACT

An infrared polarizer has a transparent substrate on which a pattern of spaced metal stripes is deposited. The stripe thickness is approximately equal to at least the stripe spacing which results in a substantial increase of the polarization contrast as compared to that of conventional polarizers having thinner stripes.

4 Claims, 1 Drawing Sheet

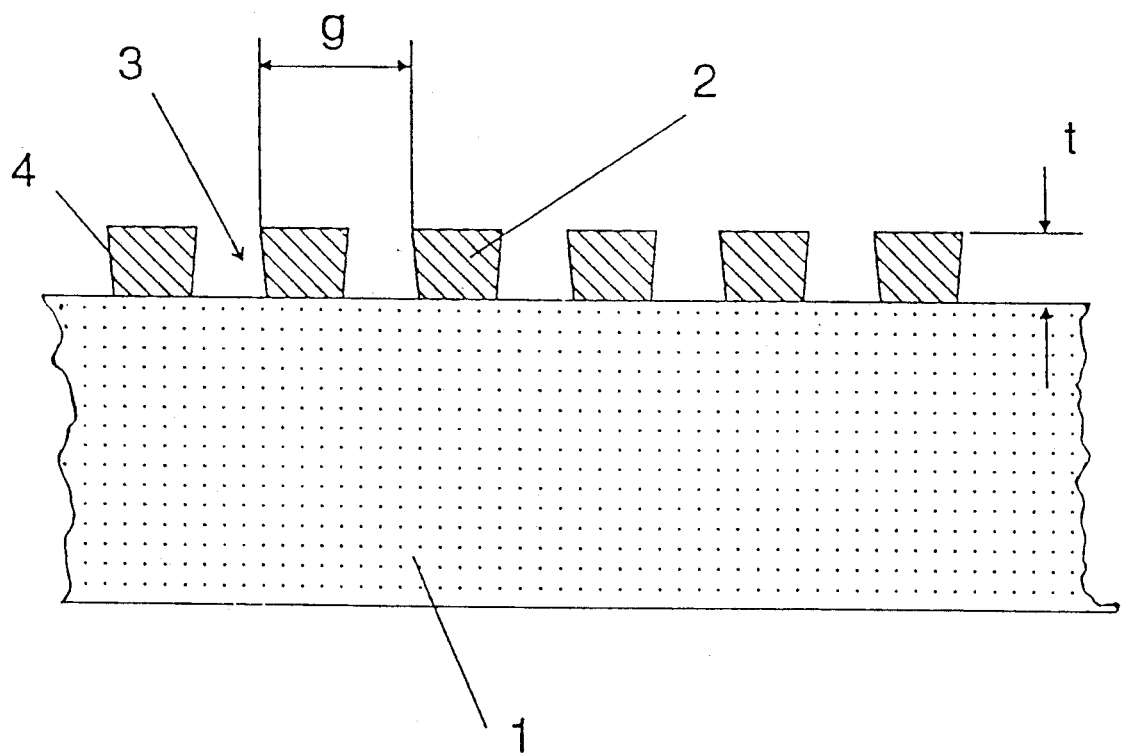

POLARIZER FOR INFRARED RADIATION

FIELD OF THE INVENTION

The invention relates to a polarizer for electro-magnetic radiation, in particular for infrared radiation in the wavelength range from 1 to 1000 μm, preferably 100 to 1000 μm.

DESCRIPTION OF THE RELATED ART

Since Heinrich Hertz a grid of parallel-tensioned wires is used as a polarizer for electromagnetic radiation. To prevent diffraction occurring it is necessary to satisfy the condition that the spatial period g of the grid (grating) structure is selected smaller than the wavelength λ used. Using the currently available smallest wire thickness of 5 μm it is possible to achieve a satisfactory polarization contrast of 100 to 1 in the far-infrared spectral range (wavelength ≧ 100 μm). Polarizer grating of this kind having round-section wires are described, for example, in J. Opt. Soc. Am. 71, 184 (1981) by J. A. Beunen et al. and in U.S. Pat. No. 2,224,214 (Brown).

For laser applications, however, a higher contrast is required. One Hertz-type polarizer variant which is more suitable for this purpose consists of a transparent substrate on which a parallel arrangement of metal stripes is deposited which is currently photolithically possible with a spatial period of g=0.8 μm. By means of such a polarizer contrasts as high as 200 to 1 can be achieved for a $CO_2$ laser beam.

From the U.S. Pat. No. 4,289,381 (Garvin et al) it is known how to improve the polarization contrast by stacking two such stripe-type gratings.

SUMMARY OF THE INVENTION

An object of the invention consists of creating a stripe-type polarization grating of simple configuration with which considerably higher contrasts can be achieved. The invention is embodied in a polarizer comprising a pattern of parallel stripes made of an electrically conductive or opaque material which have a predetermined width and a predetermined mutual spacing and form a grating having a predetermined spatial or grating period (=width+spacing). According to the invention the stripes have a rectangular or trapezoidal cross-section and a thickness equal to or greater than said predetermined spacing.

Whilst the thickness t of the stripes deposited on the substrate has been usually of the order of 0.2 μm, the stripes according to the invention are essentially thicker; results indicating surprisingly that the contrast achievable is then considerably improved. One further advantage resulting from this measure is that the spatial period of the stripe pattern can be increased without impairing the contrast. In the aforementioned example of a $CO_2$ laser the period can be increased from g=0.8 μm to, for example, 4 μm thus making production of such a filter considerably more simple.

This surprising improvement of the contrast can be achieved even when the increase in the coating thickness t is only relatively slight; a polarization contrast of approx. 200 to 1 being achievable for all wavelengths ≧ 2 g, when the coating thickness t is made roughly half of the spatial period of the stripe arrangement, i.e. t equal to roughly the spacing between neighboring stripes, whereby the cross-section of the space between two conductor stripes is more or less square. The aforementioned contrast is sufficient for many applications, but it can be increased even more when the stripe thickness t is further increased. Doubling t produces roughly a square increase in the contrast.

There are at least two different methods suitable for producing the metal stripes in the thickness according to the invention: either homogenous metal films are deposited on the substrate by vacuum deposition or sputtering and additional plating in the desired thickness and the striped spacings or gaps are then etched out or metal stripes deposited and are allowed to grow by electroless plating to the desired thickness. In both cases, however, the edges of the metal stripes result slanting and not vertical so that the section of the slots in-between and thus also the stripes is trapezoidal. Although this tends to reduce the contrast, this reduction can be compensated by increasing the coating thickness accordingly so that no disadvantage results.

The polarizer in accordance with the invention is suitable in particular for infrared radiation in the range 1 through 1000 μm. Areas of application are, for example, laser metrology, photometry, astronomy and beam splitters for Fourier spectrometers. Tests indicate that the polarization contrast can be enhanced by at least one power of ten in accordance with the teaching of the invention.

BRIEF DESCRIPTION OF THE DRAWING

The invention shall now be explained in more detail on the basis of the sole FIGURE showing a greatly magnified partial cross-sectional view of one preferred embodiment of the polarizer in accordance with the invention.

DESCRIPTION OF THE PREFERRED EMBODIMENT

On a substrate 1 which is transparent for the radiation to be polarized and which may be a Kapton or polythene film, a metal film pattern of gold stripes 2 is deposited which, in this case, can have an average width of approx. 2.2 μm, and average spacing of approx. 1.8 μm and a thickness of t=1.8 μm. The cross-section of the stripes 2 is slightly trapezoidal.

The spatial period g amounts to 4 μm, so that the thickness t is slightly less than half the period g. It will be seen that the gaps or slots 3 between each two gold stripes 2 have roughly the same width as the coating thickness t. Also obvious are the slightly slanting edges 4 of the gold stripes stemming from production restrictions. The polarization contrast achieved with these dimensions in the far-infrared region (wavelength ≧ 100 μm) amounts to approx. 6000 to 1 which can be enhanced even more by further increasing the coating thickness t.

What is claimed is:

1. A grating-type infrared transmission polarizer for radiation having a wavelength within a range of from 1 to 1000 microns comprising:
   a) a transparent film substrate, said substrate being transparent to infrared radiation having a wavelength in said range of 1 to 1000 microns, said transparent film substrate having a planar support surface; and
   b) a grating structure having a grating period less than the wavelength of radiation in said range, said structure being deposited on said planar support surface of said transparent film substrate, said grating structure comprising a regular pattern of parallel electrically conductive stripes of essentially parallel rectangular or trapezoidal cross-sectional shape, said stripes each having a similar width measured in a direction parallel to said planar support surface and a similar thickness measured in a direction perpendicular to said support surface and each of said stripes being separated from its respective adjacent stripes by a similar spacing, wherein said grating period is equal to the sum of said width and said spacing and said thickness of said stripes is greater than said spacing separating said conductive stripes.

2. A transmission polarizer according to claim 1 wherein said stripe thickness is twice said spacing separating said conductive stripes.

3. A transmission polarizer according to claim 1 wherein said grating period is approximately 4 microns.

4. A transmission polarizer according to claim 3 wherein said stripe thickness is slightly less than half said grating period.

* * * * *